United States Patent
Aoki et al.

(10) Patent No.: US 7,609,282 B2
(45) Date of Patent: Oct. 27, 2009

(54) IMAGE DISPLAY METHOD AND APPARATUS

(75) Inventors: Hiroshi Aoki, Yokohama (JP); Ryo Hasegawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 673 days.

(21) Appl. No.: 11/040,563

(22) Filed: Jan. 20, 2005

(65) Prior Publication Data

US 2005/0190300 A1  Sep. 1, 2005

(30) Foreign Application Priority Data

Feb. 24, 2004  (JP)  ............... 2004-047668

(51) Int. Cl.
*G09G 5/10*  (2006.01)

(52) U.S. Cl. .............. 345/690; 345/698; 345/214; 345/617

(58) Field of Classification Search ............ 345/690, 345/76–77, 84, 87, 204; 348/603, 607–608, 348/618, 625, 687, 673, 678
See application file for complete search history.

(56) References Cited

U.S. PATENT DOCUMENTS

| | | | | |
|---|---|---|---|---|
| 5,045,926 A | * | 9/1991 | Amano et al. | 348/627 |
| 5,272,533 A | * | 12/1993 | Akiyama et al. | 348/607 |
| 6,597,407 B1 | * | 7/2003 | Taketani et al. | 348/625 |
| 6,674,486 B2 | * | 1/2004 | Ueyama | 348/627 |
| 7,215,822 B2 | * | 5/2007 | Murai et al. | 382/264 |
| 7,227,559 B2 | * | 6/2007 | Aoki et al. | 345/690 |
| 7,319,496 B2 | * | 1/2008 | Uchida et al. | 348/625 |
| 7,333,081 B2 | * | 2/2008 | Aoki et al. | 345/102 |
| 7,433,079 B2 | * | 10/2008 | Kotani | 358/1.9 |
| 2001/0017619 A1 | * | 8/2001 | Takeuchi | 345/204 |
| 2001/0048485 A1 | * | 12/2001 | Ueyama | 348/627 |
| 2003/0189558 A1 | | 10/2003 | Aoki et al. | |
| 2004/0036899 A1 | * | 2/2004 | Takano et al. | 358/1.9 |
| 2004/0263887 A1 | * | 12/2004 | Kotani | 358/1.9 |

FOREIGN PATENT DOCUMENTS

| | | |
|---|---|---|
| EP | 0374372 A2 | 6/1990 |
| EP | 0374372 A3 | 6/1990 |
| EP | 1251479 A1 | 10/2002 |

(Continued)

OTHER PUBLICATIONS

Machine Translation of JP-10126646A.*

(Continued)

*Primary Examiner*—Alexander Eisen
*Assistant Examiner*—Jason M Mandeville
(74) *Attorney, Agent, or Firm*—Townsend and Townsend and Crew LLP

(57) ABSTRACT

Image display method and apparatus are capable of displaying an input image signal in an optical condition on a display screen according to the brightness of the screen image. The image display apparatus for performing a specified process on an input image signal and displaying an image by the image signal on a display unit comprises a controller for adjusting a signal level detecting circuit for detecting brightness levels of an image by the input image signal by controlling the sharpness of an image by the image signal according to a detected signal level in such a way that as the detected signal level rises, the sharpness increases.

6 Claims, 5 Drawing Sheets

FOREIGN PATENT DOCUMENTS

| | | | | |
|---|---|---|---|---|
| JP | 03058687 A | * | 3/1991 | |
| JP | 04-090270 A | | 3/1992 | |
| JP | 07-201292 A | | 8/1995 | |
| JP | 08-138558 | | 5/1996 | |
| JP | 10126646 A | * | 5/1998 | |
| JP | 10-208637 | | 8/1998 | |
| JP | 11-284880 A | | 10/1999 | |
| JP | 2000-284739 | | 10/2000 | |
| JP | 2001-125535 | | 5/2001 | |
| JP | 2003-299118 | | 10/2003 | |
| JP | 2004-007202 A | | 1/2004 | |
| JP | 2004007202 A | * | 1/2004 | |

OTHER PUBLICATIONS

Machine Translation of JP-2004-007202.*
Japan Patent Office (JPO) office action for JPO patent application JP2004-047668 (Jan. 13, 2009).

* cited by examiner

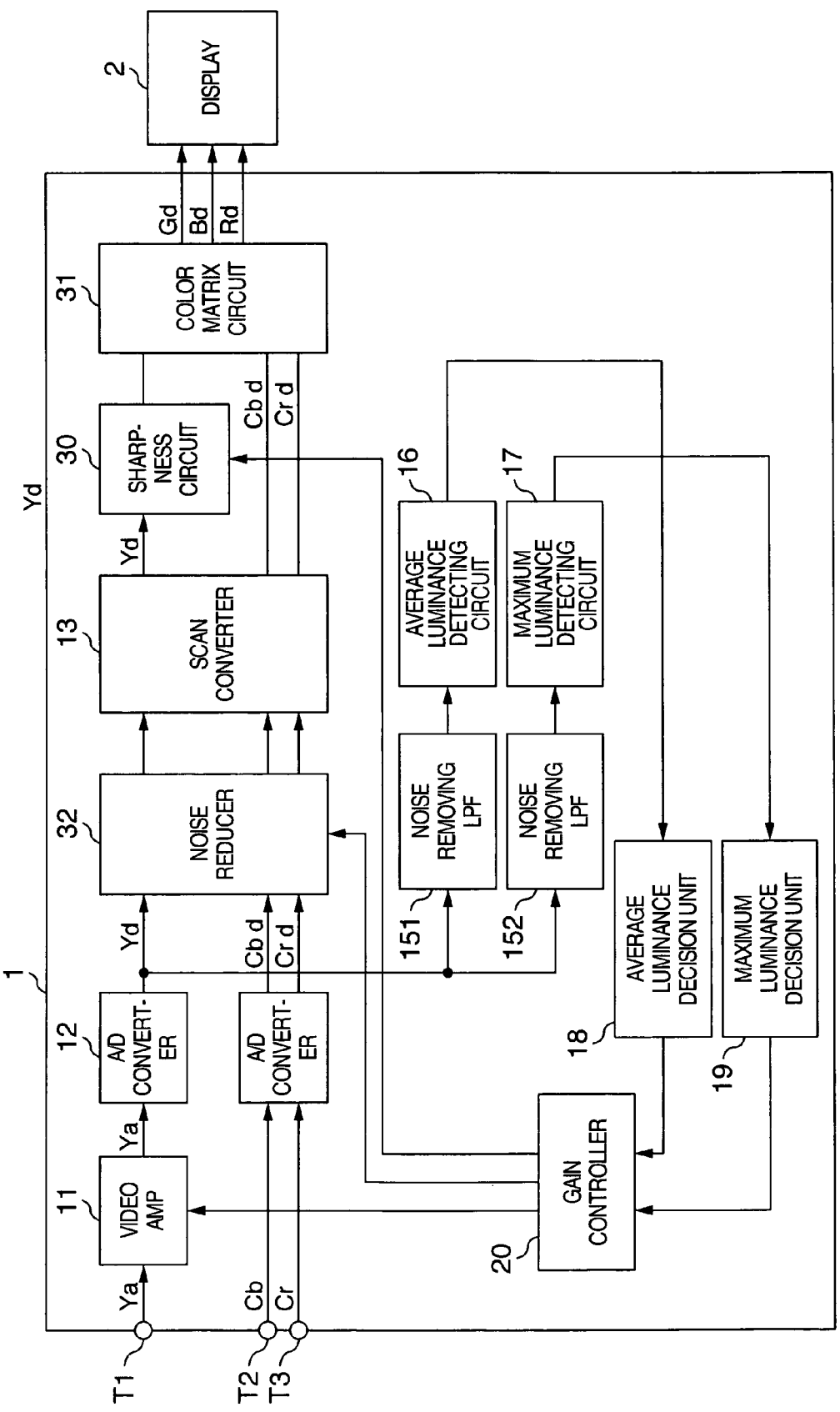

IMAGE DISPLAY METHOD AND APPARATUS

INCORPORATION BY REFERENCE

The present application claims priority from Japanese application JP2004-047668 filed on Feb. 24, 2004, the content of which is hereby incorporated by reference into this application.

BACKGROUND OF THE INVENTION

1. Field of the Invention

The present invention relates to an image display method and apparatus that display a television signal or an image signal input from a personal computer or the like on a display unit, such as a PDP (plasma display panel) or a liquid crystal panel, for example.

2. Description of the Related Art

In recent years, image display apparatuses using fixed-pixel devices, such as PDPs and a liquid crystal panels, are spreading widely and their display screens are becoming progressively larger.

Meanwhile, the above-mentioned image display apparatuses with fixed-pixel devices, such as PDPs and liquid crystal panels, are inferior in terms of contrast to conventional types of image display units using the cathode ray tubes. Therefore, to improve the contrast, improvements have been made to the drive system and the structure thereof that enhance the luminous efficiency of the phosphors. Technologies of prior art of this kind disclosed in JP-A-10-208637 and JP-A-8-138558, for example, are well known.

SUMMARY OF THE INVENTION

As mentioned above, in the image display apparatuses having fixed pixel devices, such as PDPs and liquid crystal panels, it is possible to improve the contrast. Not only with those display apparatuses using fixed pixel devices such as a PDP or a liquid crystal panel, but, the image display apparatuses usually have a problem pointed out below.

More specifically, generally, when a displayed image on a display apparatus is dark on the whole screen, noise signals or the like mixed in the image signal appear as white dots on the screen image, giving a rough effect to the picture quality. Moreover, when the screen image is bright in its entirety, the contours of features displayed becomes indistinct. This problem is particularly notable with the image display apparatuses using fixed pixel devices, such as PDPs and liquid crystal panels of high definition achieved by an enlarged display screen and the greatly increased number of display pixels.

The present invention has been made with the above-mentioned problem in the prior art in mind. The present invention provides an image display method capable of displaying the input image signal in an optimal condition on the display screen regardless of the enlargement of the display screen size, and also provides apparatus for realizing the same image display method.

The present invention provides an image display method for performing a specified process on an input image signal and displaying an image by the input image signal on a display unit, comprising a step of detecting brightness levels of an image by the input image signal and a step of adjusting the sharpness of the image by the image signal according to the signal level detected, and also provides apparatus therefor.

According to the present invention, in the above-mentioned image display method and apparatus therefore, the above-mentioned signal level may be detected by detecting an average signal level of the input image signal for one frame of an image. Or, the signal level may be detected by detecting the gain of means for amplifying the input image signal. Also, the above-mentioned sharpness may be controlled by adjusting in such a way that as the signal level detected by the signal level detecting means rises, its sharpness increases. Moreover, the strength of removing noise from the input image signal may be controlled according to the signal level detected.

According to the image display method and apparatus of the present invention, regardless of the enlargement of the display screen, the input image signal may be displayed in an optimum condition on the display screen in accordance with the brightness of the screen image.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram showing a general structure of the image display apparatus according to the embodiment of the present invention;

DETAILED DESCRIPTION OF THE EMBODIMENTS

Figure 1:
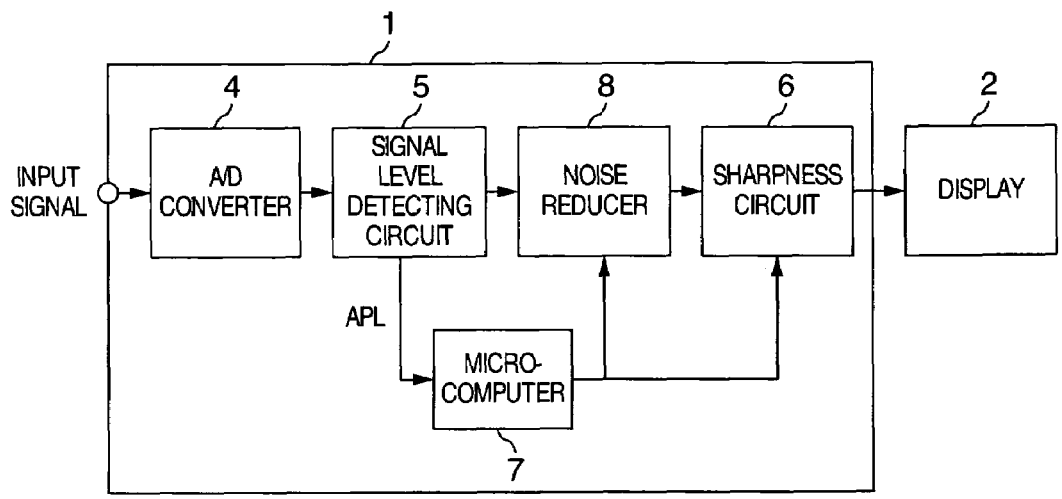
FIG. 1 is a diagram showing a basic structure of a sharpness adjusting circuit of an image display apparatus according to an embodiment of the present invention.

Embodiments of the present invention will be described in detail with reference to the accompanying drawings. FIG. 2 is a block diagram showing a general structure of an image display apparatus according to an embodiment of the present invention. In FIG. 2, reference numeral 1 denotes a tuner unit for performing a specified process on an analog image signal input from outside and outputting digital image signals Rd, Gd and Bd to a display unit 2 (a fixed pixel device, such as a PDP or a liquid crystal panel). The image display apparatus of this embodiment includes a video amplifier 11 for amplifying an analog luminance signal Ya input from an input terminal T1, an A/D converter 12 for converting the amplified analog luminance signal Ya into a digital luminance signal, and a scan converter 13 for converting the input signal into a signal with a signal timing at which the display apparatus can display the signal.

The above-mentioned tuner 1 includes an input terminal T2, and an A/D converter 14 which converts an analog color (color difference) signal Cb input from T2 and an analog color (color difference) signal Cr into digital color (color difference) signals Cbd and Crd. The digital color (color difference) signals Cbd and Crd obtained by A/D conversion are both guided to the above-mentioned scan converter 13. Further, the tuner 1 includes a color matrix circuit 31 which receives the above-mentioned digital luminance signal Yd and digital color (color difference) signals Cbd and Crd and converts them into digital image signals Rd, Gd and Bd to display red (R), green (G) and blue (B). The digital image signals Rd, Gd, and Bd output from the color matrix circuit 31 are supplied to the above-mentioned display unit 2 and displayed. In this embodiment, between the A/D converters 12, 14 and the scan converter 13, there is provided a noise reducer 32 to remove noise from the above-mentioned digital luminance signal Yd and digital color (color difference) signals Cbd and Crd.

In addition to the basic structure described above, the tuner 1 further includes noise-removing low pass filters LPF151 and LPF152 to remove noise from the digital luminance signal Yd obtained by the above-mentioned A/D conversion, an average luminance detecting circuit 16 for detecting an average luminance level for a predetermined time period (one frame or one field, for example) from an output signal (digital luminance signal) of the noise-removing LPF151, a maximum luminance detecting circuit 17 for detecting the maximum luminance level for a predetermined time period (one frame or one field, for example) from an output signal (digital luminance signal) of the noise-removing LPF152, an average luminance decision unit 18 for receiving the average luminance level information (signal) detected by the above-mentioned average luminance detecting circuit 16 and deciding a luminance area to which the average luminance level corresponds, and a maximum luminance decision unit 19 for receiving the maximum luminance level information (signal) detected by the above-mentioned maximum luminance level detecting circuit 17 and deciding a luminance area to which the maximum luminance level corresponds.

Reference numeral 20 in FIG. 2 denotes a gain controller for forming a control signal to control the gain or the like of the video amplifier 11 according to information about the fluminance area to which the average luminance level corresponds and the luminance area to which the maximum luminance level corresponds. This gain controller 20 is formed by a microcomputer, for example. In the image display apparatus according to the present invention, as shown in FIG. 2, between the above-mentioned scan converter 13 and the above-mentioned color matrix circuit 31, there is provided the sharpness circuit 30 which will be described in detail later. Control of the sharpness of the digital luminance signal Yd by the sharpness circuit 30 is controlled by a signal sent from the gain controller 20. In addition, the above-mentioned A/D converters 12, 14, scan converter 13, noise-removing LPFs 151, 152, average luminance detecting circuit 16, maximum luminance detecting circuit 17, sharpness circuit 30, and color matrix circuit 31 are fabricated as an LSI (large scale integrated circuit), for example.

The accompanying drawing FIG. 1 shows a basic structure of the sharpness adjusting circuit for adjusting the sharpness. As is clear from this drawing, the sharpness adjusting circuit is made up of the A/D converter 4 (corresponding to 12 in FIG. 2), the signal level detecting circuit 5 (corresponding to 16 in FIG. 2), the noise reducer (corresponding to 32 in FIG. 2), the sharpness circuit 6 (corresponding to 30 in FIG. 2), and the microcomputer (corresponding to 20 in FIG. 2) in the tuner 1 mentioned above.

Figure 3:
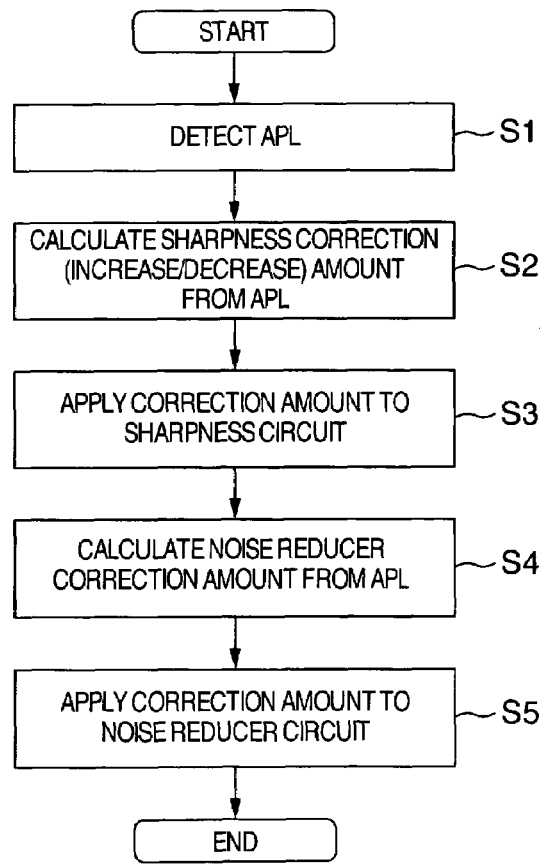
FIG. 3 is a flowchart for explaining the operation of the sharpness adjusting circuit of the present invention.

The image display apparatus whose structure has been described above, especially, the operation of the sharpness adjusting circuit will be described in detail with reference to the flowchart in the accompanying drawing FIG. 3. When a sequence of processes shown in FIG. 3 is started, an average luminance level (APL) is detected from the signal level detecting circuit 5 (Step S1). Note that an average luminance level (APL) to be detected is, as described above, a luminance level averaged for a predetermined time period, such as one frame or field, for example. From the detected average luminance level (APL), a sharpness correction amount is obtained (Step 2). By the way, an example of a method of obtaining a sharpness correction amount at this time is shown in the accompanying drawing FIG. 4A.

Figure 4A:
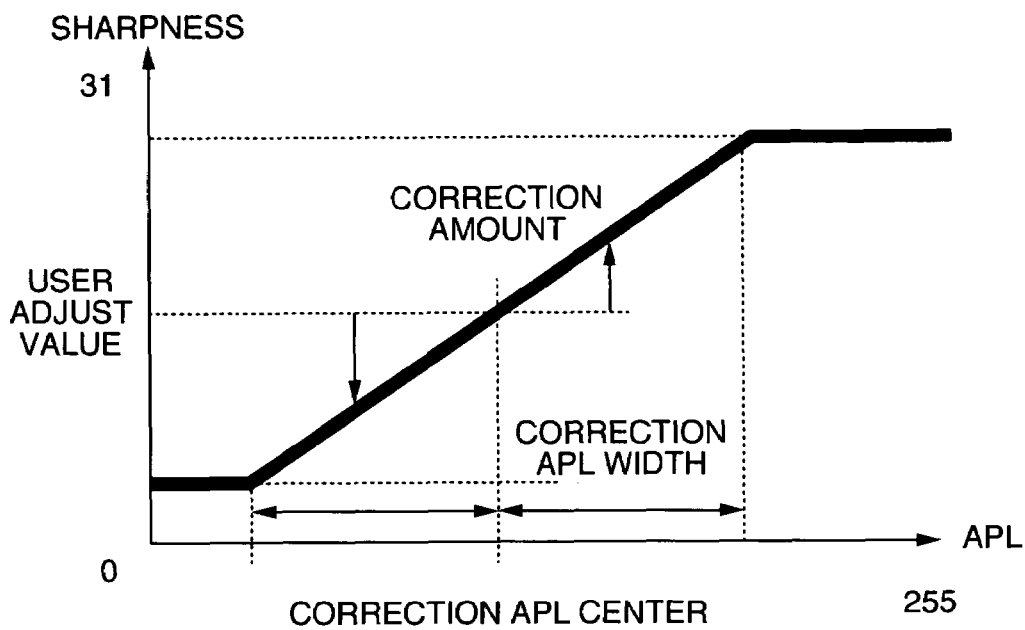
FIGS. 4A and 4B are diagrams for explaining a method for obtaining a sharpness correction amount and a noise reducer correction amount in the above-mentioned sharpness adjusting circuit.

More specifically, as shown in FIG. 4A, an APL value (correction APL center) is previously set which corresponds to a sharpness value (user adjust value) set by the user, and if a detected average luminance level (APL) from the signal level detecting circuit 5 is lower than the correction APL center, a correction amount is obtained which decreases the sharpness, or if the detected APL level is higher than the correction APL center, a correction amount is obtained which raises the sharpness. After this, the sharpness correction amount obtained at this time is applied to the above-mentioned sharpness circuit 6 (Step S3).

Figure 4B:
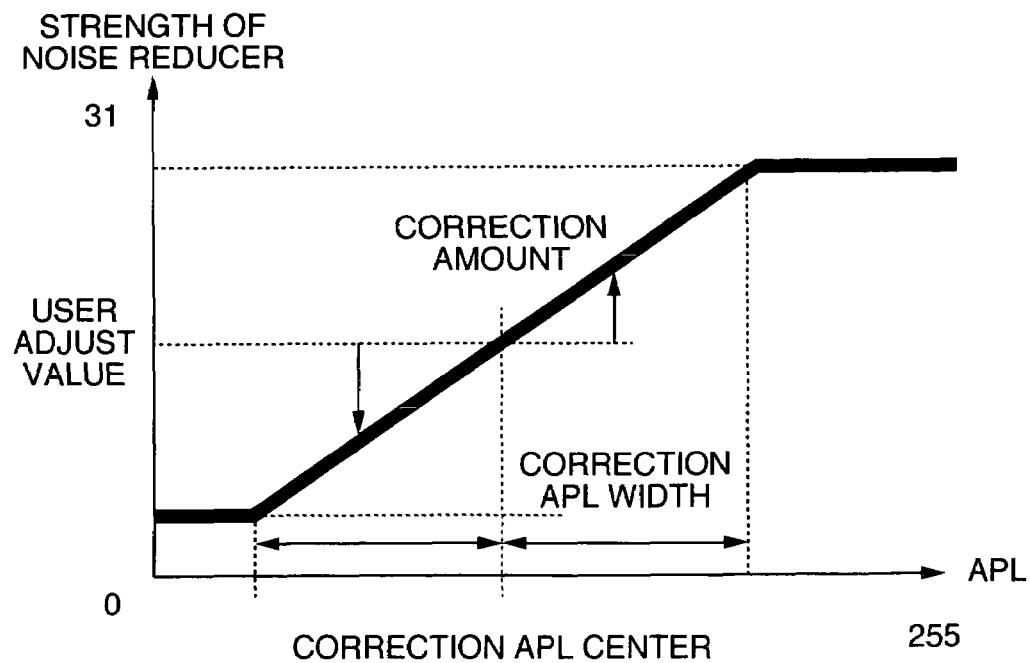

Next, from the average luminance level (APL) obtained as described above, a noise reducer correction amount is calculated (Step S4). A method for calculating a noise reducer correction amount at this time is shown in the accompanying drawing FIG. 4B. In other words, just as in the sharpness correction amount described above, an APL value (correction APL center) is set which corresponds to a noise reducer strength value (user adjust value) set in advance by the user. If an average luminance level (APL) detected by the signal level detecting circuit 5 is lower than the correction APL center, a correction amount to reduce the noise reducer strength is obtained. On the other hand, if the detected APL is higher than the correction APL center, a correction amount to raise the noise reducer strength is obtained. After this, this obtained noise reducer correction amount is applied to the above-mentioned noise reducer 8 (Step S5). Further, a sharpness correction amount and a noise reducer correction amount mentioned above may be calculated by the above-mentioned microcomputer 7 based on a function set in advance or by using a table containing a specified function. After the above processes have been executed, the whole process is finished. Note that the above processes are executed repeatedly at predetermined intervals.

According to the operation of the sharpness adjusting circuit described in detail above, when the whole screen image on the display unit 2 is dark (in other words, the detected average luminance level (APL) is lower than the correction APL center, the obtained sharpness is less than a user adjust value by an applied sharpness correction amount. On the other hand, when the whole screen image is light (in other words, the detected average luminance level (APL) is higher than the correction APL center), contrary to the above case, the obtained sharpness is more than a user adjust value by an applied sharpness correction amount. Put in other ways, the phenomenon that noise signal or the like mixed in the image signal appears as white dots on the displayed image is reduced, and on the other hand, even when the whole area of the screen is light, the contours of the features on the displayed image are prevented from becoming indistinct. Thus, it is possible to display the input image signal in optimum condition on the display screen at all times.

Furthermore, according to the above-mentioned sharpness adjusting circuit, at the same time, the strength of noise removal by the above-mentioned noise reducer 8 is increased or decreased according to the brightness of the whole displayed image (in other words, whether or not a detected average luminance level (APL) is higher than the correction APL center). Therefore, the noise signal particularly when the whole screen is dark is reduced, thereby improving picture quality. It ought to be noted that those effects are conspicuous above all in image display apparatuses using fixed pixel devices, such as PDPs or liquid crystal panels of high definition image based on the enlarged screen size and greatly increased number of display pixels.

Figure 5:
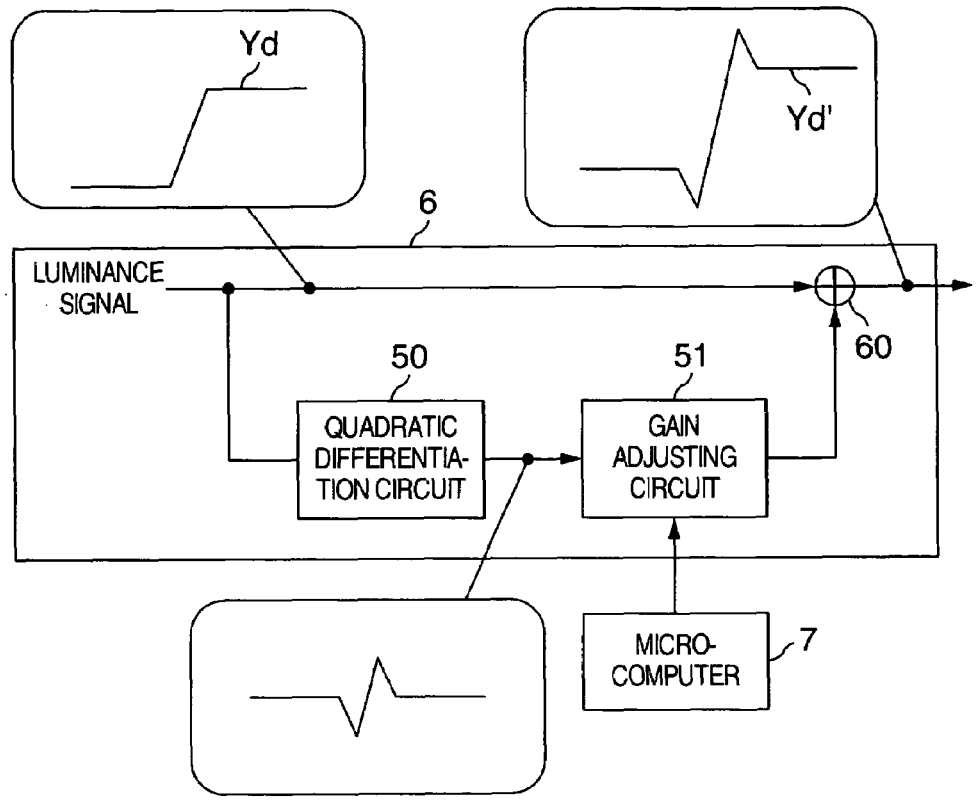
FIG. 5 is a diagram showing an example of a concrete structure of a sharpness circuit which is practically applied in the above-mentioned sharpness adjusting circuit.

Next, the accompanying FIG. 5 shows an example of a concrete circuit structure of the sharpness circuit 6 which is practically applied in the sharpness adjusting circuit. In other words, the sharpness circuit 6 is formed by connecting a path of the luminance signal (Yd) from the above-mentioned noise reducer 8 to the display unit 2 in parallel with a series connection of a quadratic differentiation circuit 50 and a gain adjusting circuit 51. The gain of the gain adjusting circuit 51 is adjusted by the microcomputer 7 and output of the gain adjusting circuit 51 is added to the luminance signal (Yd) by an adder 60 in FIG. 5 and a combined signal is output to the display unit 2.

According to the sharpness circuit 6 structured as described, as is clear also from waveform patterns in FIG. 5, part of the luminance signal (Yd) from the noise reducer 8 is subjected to a waveform process by the above-mentioned quadratic differentiation circuit 50. Subsequently, after the gain of the amplitude of the signal from the differentiation circuit 50 is adjusted by the gain adjusting circuit 51, output of the gain adjusting circuit 51 is added to the luminance signal (Yd) by the adder 60 mentioned above. Thus, changes of the waveform are accentuated to make the waveform's edges sharp as indicated by Y'd in FIG. 5.

In the embodiment described above, with regard to the structure of the image display apparatus that forms the tuner 1 shown in FIG. 2, description has been made on the assumption that the noise reducer 32 is used. However, the present invention is not limited to the above-described structure, it is possible to adopt a structure which excludes the noise reducer 32, for example. Or, in the structure of the image display apparatus, it will be possible to omit the maximum luminance detecting circuit 17 and the noise removing LPF 152 of the preceding stage.

Particularly with respect to the sharpness adjusting circuit shown in FIG. 1, the present invention is not limited to such a structure as shown. For example, it is possible to configure such a structure without the noise reducer 8 that only the sharpness is adjusted but the noise reducer is not adjusted.

Figure 6:
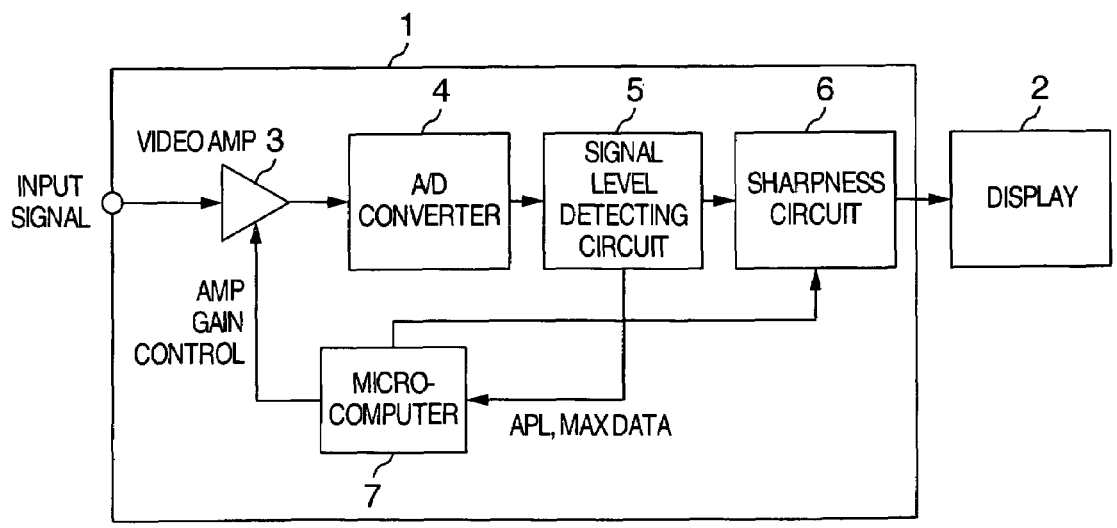
FIG. 6 is a diagram showing a structure of the sharpness adjusting circuit according to another embodiment of the present invention.

In another embodiment of the present invention, the accompanying FIG. 6 shows a structure of the sharpness adjusting circuit which adjusts the sharpness and also the gain of the video amplifier 3 (refer to 11 in FIG. 2). In other words, in this other embodiment, the above-mentioned signal level detecting circuit 5 is formed by using a noise removing LPF152 and a maximum luminance detecting circuit 17 in addition to the noise removing LPF151 and an average luminance detecting circuit 16 in FIG. 2 mentioned above. In this embodiment, the above-mentioned microcomputer 7 is used not only to adjust the sharpness circuit but also to adjust the gain of the video amplifier 11 that amplifies an input analog luminance signal Ya.

More specifically, the microcomputer 7 detects an average luminance level (APL) and also detects a maximum luminance level (MAX) of the digital luminance signal from the signal level detecting circuit 5. The sharpness is adjusted by a detected average luminance level (APL) and also, the gain of the video amplifier 3 is adjusted according to the detected maximum luminance level (MAX). By this method, a screen image with improved picture quality can be obtained.

Figure 7:
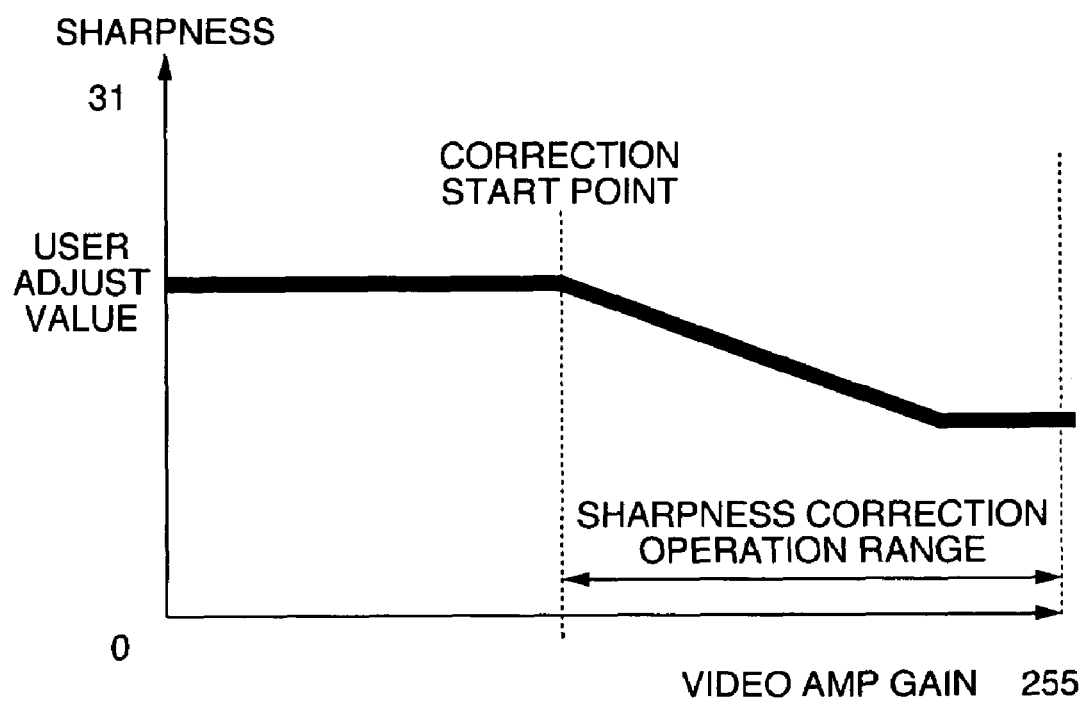
FIG. 7 is a diagram for explaining a method for adjusting sharpness according to yet another embodiment of the present invention.

In the above embodiment, description has been made about the case where an average luminance level (APL) obtainable from the average luminance detecting circuit 16 is used to detect brightness levels of an image displayed on the display unit 2. However, the present invention is not limited to this method. To cite an example, instead of an average luminance level (APL) described above, brightness levels can be detected by detecting, for example, gain of the video amplifier 11 for amplifying an input analog luminance signal Ya mentioned above. In this case, as shown in the accompanying FIG. 7, for example, a correction start point is set in advance, which corresponds to a luminance adjust value set by the user, for example, and when a video amp gain exceeds this correction start point, the sharpness is adjusted as indicated by a characteristic curve of FIG. 7. Note that this can obviously be realized in a similar way as described above, because the amp gain of the video amplifier 11 is controlled by the microcomputer 7 as shown in the structure of FIG. 2.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus for performing a specified process on an input image signal and displaying an image based on the image signal on a display unit, comprising:
    a detector unit which detects an average luminance level of the image based on the input image signal; and
    a controller which performs a sharpness adjustment for correcting contours of the image according to the average luminance level detected by said detector unit, wherein the controller includes a predetermined reference average luminance level as a center correction value corresponding to a user adjustment value set by a user; and
    wherein the controller determines a correction amount of the sharpness adjustment so as to reduce a sharpness of the image to less than the user adjustment value when the detected average luminance level is lower than the predetermined reference average luminance level and to increase the sharpness of the image to more than the user adjustment value when the detected average luminance level is higher than the predetermined reference average luminance level.

2. The image display apparatus according to claim 1, wherein said detector unit detects the average luminance level of the input image signal for one frame.

3. The image display apparatus according to claim 1, wherein said detector unit detects gain of an amplifier for amplifying the input image signal.

4. An image display method for displaying an image by performing a specified process on an input image signal and displaying an image based on the image signal on a display unit, comprising the steps of:
    detecting an average luminance level of the image based on the input image signal;
    performing a sharpness adjustment for adjusting a sharpness of the image by correcting contours of the image based on the detected average luminance level of the image signal; and
    determining a correction amount of the sharpness adjustment so as to reduce a sharpness of the image to less than a user adjustment value set by a user when the average luminance level is detected as being lower than a predetermined reference average luminance level as a center correction value corresponding to the user adjustment value and to increase the sharpness of the image to more than the user adjustment value when the average luminance level is detected as being higher than the predetermined reference average luminance level.

5. The image display method according to claim 4, wherein the average luminance level is detected by detecting an average signal level of input image signals for one frame.

6. The image display method according to claim 4, wherein said signal level is detected by detecting the gain of means for amplifying the input image signal.

* * * * *

UNITED STATES PATENT AND TRADEMARK OFFICE
CERTIFICATE OF CORRECTION

PATENT NO. : 7,609,282 B2
APPLICATION NO. : 11/040563
DATED : October 27, 2009
INVENTOR(S) : Aoki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Twelfth Day of October, 2010

David J. Kappos
*Director of the United States Patent and Trademark Office*